US012615349B2

(12) United States Patent
Wang et al.

(10) Patent No.: US 12,615,349 B2
(45) Date of Patent: Apr. 28, 2026

(54) MEETING VIDEO SUBSTITUTES

(71) Applicant: Hewlett-Packard Development Company, L.P., Spring, TX (US)

(72) Inventors: Lan Wang, Spring, TX (US); Qian Lin, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 141 days.

(21) Appl. No.: 18/264,633

(22) PCT Filed: Mar. 11, 2021

(86) PCT No.: PCT/US2021/022007
§ 371 (c)(1),
(2) Date: Aug. 8, 2023

(87) PCT Pub. No.: WO2022/191848
PCT Pub. Date: Sep. 15, 2022

(65) Prior Publication Data
US 2024/0121358 A1 Apr. 11, 2024

(51) Int. Cl.
*H04N 7/15* (2006.01)
*G06T 7/20* (2017.01)
*G06V 40/20* (2022.01)

(52) U.S. Cl.
CPC .............. *H04N 7/157* (2013.01); *G06T 7/20* (2013.01); *G06V 40/20* (2022.01)

(58) Field of Classification Search
None
See application file for complete search history.

(56) References Cited

U.S. PATENT DOCUMENTS

| | | | |
|---|---|---|---|
| 8,044,989 B2 | 10/2011 | Mareachen | |
| 8,310,521 B2* | 11/2012 | Zhang .................. | G11B 27/036 |
| | | | 709/201 |
| 9,372,550 B2 | 6/2016 | Lin et al. | |
| 9,424,678 B1 | 8/2016 | Enakiev et al. | |
| 9,582,762 B1* | 2/2017 | Cosic ..................... | H04N 7/157 |
| 9,883,144 B2 | 1/2018 | Marlow et al. | |
| 10,360,716 B1* | 7/2019 | van der Meulen ..... | G10L 25/57 |
| 10,579,921 B1* | 3/2020 | Cosic ..................... | G06V 20/00 |
| 2010/0115427 A1 | 5/2010 | Schroeter et al. | |
| 2012/0327176 A1* | 12/2012 | Kee .......................... | H04N 7/15 |
| | | | 348/E7.083 |
| 2015/0208031 A1* | 7/2015 | Lievens .................. | G06F 3/017 |
| | | | 348/14.08 |
| 2019/0297382 A1 | 9/2019 | Skarakis | |

FOREIGN PATENT DOCUMENTS

WO        2018/194243 A1    10/2018

* cited by examiner

*Primary Examiner* — Hemant S Patel
(74) *Attorney, Agent, or Firm* — Quarles & Brady LLP

(57) ABSTRACT

In some examples, an electronic device includes a machine learning circuit to detect a user break from an online meeting based on a video stream. In some examples, the machine learning circuit is to send an indicator in response to detecting the user break. In some examples, the electronic device includes a processor coupled to the machine learning circuit. In some examples, the processor is to replace a portion of the video stream with substitute video in response to the indicator.

18 Claims, 6 Drawing Sheets

300

302 — Start an online meeting

304 — Capture substitute video

306 — User break?

No

Yes

308 — Replace a portion of the video stream

310 — User break ended?

Yes

No

312 — Use video stream

300

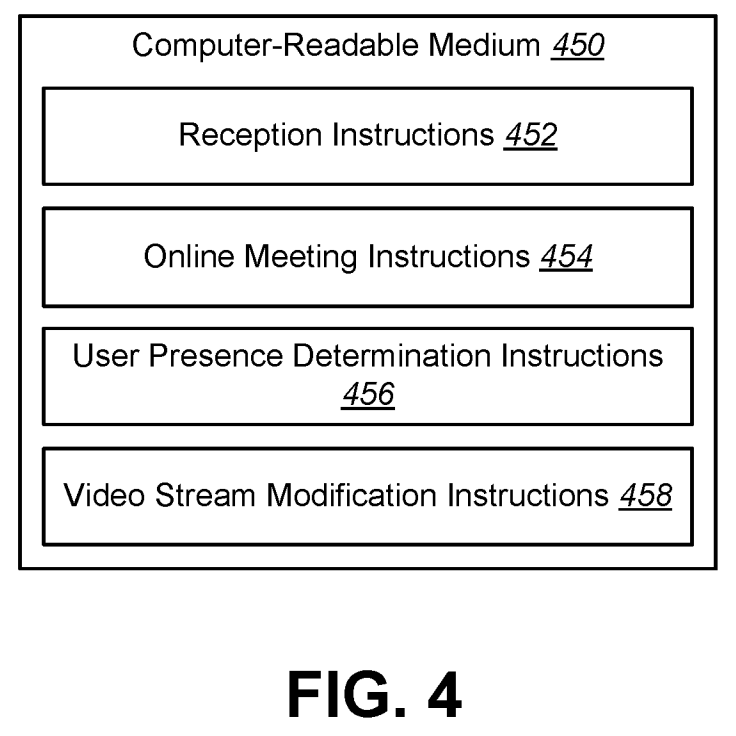

Computer-Readable Medium 450

Reception Instructions 452

Online Meeting Instructions 454

User Presence Determination Instructions 456

Video Stream Modification Instructions 458

FIG. 4

MEETING VIDEO SUBSTITUTES

BACKGROUND

Electronic technology has advanced to become virtually ubiquitous in society and has been used for many activities in society. For example, electronic devices are used to perform a variety of tasks, including work activities, communication, research, and entertainment. Different varieties of electronic circuitry may be utilized to provide different varieties of electronic technology.

BRIEF DESCRIPTION OF THE DRAWINGS

FIG. 4 is a block diagram illustrating an example of a computer-readable medium for substituting meeting video;

DETAILED DESCRIPTION

Figure 1:
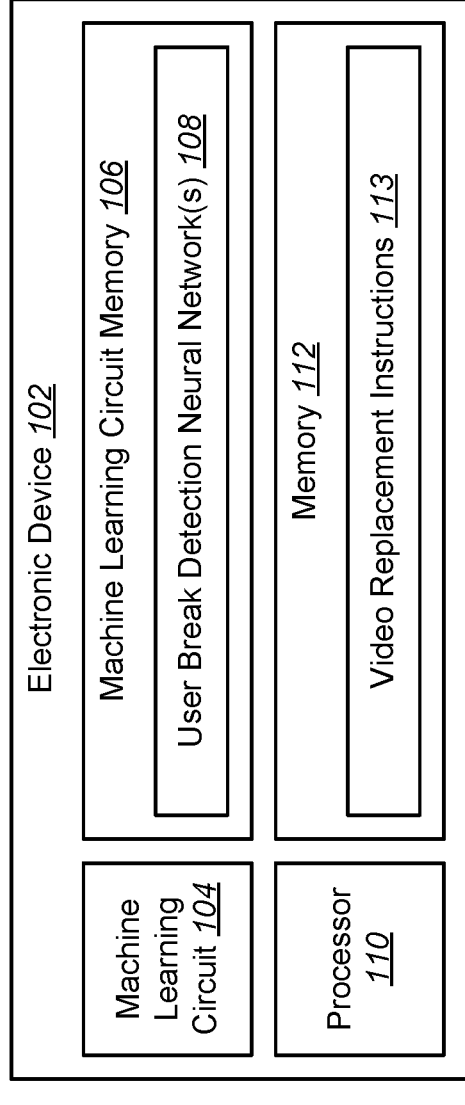
FIG. 1 is a block diagram illustrating an example of an electronic device that may be used to provide meeting video substitutes.

Some examples of the techniques described herein may be related to meeting video substitutes. As people work from home and spend time on online meetings (e.g., virtual conference calls and/or online collaboration), it may be helpful to allow a user to take a break or breaks from an online meeting. A break may allow a user to stand up and stretch, to get a beverage, and/or to be away for a period of time (e.g., a relatively short period of time, 30 seconds, 2 minutes, 5 minutes, 10 minutes, 20 minutes, etc.). Some examples of the techniques described herein may allow a user to take a break while reducing disruption to an online meeting (e.g., a meeting attendee or attendees). For instance, some electronic devices may provide machine learning (e.g., artificial intelligence, computer vision, etc.) to enable online meeting breaks with reduced disruption.

Some examples of the techniques described herein may utilize machine learning. Machine learning may be a technique where a machine learning model may be trained to perform a task or tasks based on a set of examples (e.g., data). Training a machine learning model may include determining weights corresponding to structures of the machine learning model. Artificial neural networks may be a kind of machine learning model that may be structured with nodes, layers, and/or connections.

Examples of neural networks may include convolutional neural networks (CNNs) (e.g., CNN, deconvolutional neural network, inception module, residual neural network, etc.) and recurrent neural networks (RNNs) (e.g., RNN, multi-layer RNN, bi-directional RNN, fused RNN, clockwork RNN, etc.). Different neural network depths may be utilized in accordance with some examples of the techniques described herein.

In some examples, the machine learning model(s) may be trained with a set of training images. For instance, a set of training images may include images of an object(s) for detection (e.g., images of a user or users, people, etc.). In some examples, the set of training images may be labeled with the class of object(s) and/or location (e.g., bounding box) of object(s) in the images. The machine learning model(s) may be trained to detect the object(s) by iteratively adjusting weights of the model(s) and/or evaluating a loss function(s). The trained machine learning model may detect the object(s) (with a degree of probability, for instance). For example, a video stream may be utilized with computer vision techniques to detect an object(s) (e.g., a user or users, people, etc.).

In some examples, machine learning may be used to detect actions and/or motions. For instance, machine learning may be utilized to detect a user's actions (e.g., walking away, standing up, etc.). For example, a user break from an online meeting (e.g., conference call) may be detected and an avatar, prerecorded user image, and/or prerecorded video may be displayed to reduce disruption of the meeting. For instance, machine learning may be used to detect a user's departure and/or absence from an online meeting and display substitute video (e.g., a substitute user image and/or avatar) to allow the user to take a break.

Throughout the drawings, similar reference numbers may designate similar or identical elements. When an element is referred to without a reference number, this may refer to the element generally, with and/or without limitation to any particular drawing or figure. In some examples, the drawings are not to scale and/or the size of some parts may be exaggerated to more clearly illustrate the example shown. Moreover, the drawings provide examples in accordance with the description. However, the description is not limited to the examples provided in the drawings.

FIG. 1 is a block diagram illustrating an example of an electronic device 102 that may be used to provide meeting video substitutes. An electronic device may be a device that includes electronic circuitry. Examples of the electronic device 102 may include a computer (e.g., laptop computer), a smartphone, a tablet computer, mobile device, camera, etc. The electronic device 102 may include and/or may be coupled to a machine learning circuit 104, machine learning circuit memory 106, processor 110, and/or memory 112. In some examples, components of the electronic device 102 may be coupled via an interface or interfaces (e.g., bus(es), wire(s), connector(s), etc.). The electronic device 102 may include additional components (not shown) and/or some of the components described herein may be removed and/or modified without departing from the scope of this disclosure. For example, the electronic device 102 may include an image capturing device (e.g., integrated image capturing device). In some examples, the electronic device 102 may be in communication with a separate image capturing device. For instance, a separate image capturing device (e.g., web cam, camera, time of flight sensor, radar, etc.) may be attached to and/or may send a video stream to the electronic device 102.

In some examples, the electronic device 102 may include a communication interface or interfaces (not shown in FIG. 1). The electronic device 102 may utilize the communication interface(s) to communicate with an external device or devices (e.g., networked device(s), server(s), smartphone(s), microphone(s), camera(s), printer(s), computer(s), etc.). In some examples, the electronic device 102 may be in communication with (e.g., coupled to, have a communication link with) a display device(s). In some examples, the electronic device 102 may include an integrated display panel(s) and/or integrated microphone(s).

The communication interface may include hardware and/or machine-readable instructions to enable a component or components (e.g., machine learning circuit 104, machine learning circuit memory 106, processor 110, and/or memory 112, etc.) of the electronic device 102 to communicate with the external device or devices. The communication interface may enable a wired and/or wireless connection to the external device or devices. In some examples, the communication interface may include a network interface card and/or may also include hardware and/or machine-readable instructions to enable the electronic device 102 to communicate with various input and/or output devices. Examples of output devices include a display device(s), speaker(s), headphone(s), etc. Examples of input devices include a keyboard, a mouse, a touch screen, camera, microphone, etc. In some examples, a user may input instructions and/or data into the electronic device 102 using an input device or devices.

In some examples, the communication interface(s) may include a mobile industry processor interface (MIPI) and/or Universal Serial Bus (USB) interface. An integrated image capturing device and/or separate image capturing device (e.g., webcam) may be utilized to capture and/or feed a video stream to the electronic device 102 (e.g., to the machine learning circuit 104 and/or the processor 110). For instance, the communication interface(s) (e.g., MIPI and/or USB interface) may be coupled to the machine learning circuit 104 and/or to the processor 110. The communication interface(s) may provide the video stream(s) to the machine learning circuit 104 and/or the processor 110 from the image capturing device(s).

The image capturing device may be a device to capture a video stream. Examples of the image capturing device may include an image sensor(s), optical camera(s), web camera(s), etc. For instance, the image capturing device may be a device to capture optical (e.g., visual) image data (e.g., a sequence of video frames).

In some examples, the electronic device 102 may include a processor 110. Examples of the processor 110 may include a general-purpose processor, central processing unit (CPU), and/or a graphics processing unit (GPU). In some examples, the processor 110 may be an application processor. In some examples, the processor 110 may perform one, some, or all of the aspects, operations, elements, etc., described in one, some, or all of FIG. 1-7. In some examples, the processor 110 may be coupled to the machine learning circuit 104. The processor 110 may be separate from the machine learning circuit 104. For instance, the machine learning circuit 104 may be separate circuitry and/or hardware from the processor 110 (e.g., general-purpose processor and/or CPU of the electronic device 102). In some examples, the machine learning circuit 104 and the processor 110 may be combined into one processor and/or the operations of the machine learning circuit 104 and the processor 110 may be performed by one processor.

In some examples, the electronic device 102 may include memory 112. The memory 112 may be an electronic, magnetic, optical, and/or other physical storage device that contains or stores electronic information (e.g., instructions and/or data). The memory 112 may be, for example, Random Access Memory (RAM), Electrically Erasable Programmable Read-Only Memory (EEPROM), a storage device, an optical disc, and/or the like. In some examples, the memory 112 may be volatile and/or non-volatile memory, such as Dynamic Random Access Memory (DRAM), EEPROM, magnetoresistive random-access memory (MRAM), phase change RAM (PCRAM), memristor, flash memory, and/or the like. In some examples, the memory 112 may be a non-transitory tangible machine-readable or computer-readable storage medium, where the term "non-transitory" does not encompass transitory propagating signals. In some examples, the memory 112 may be included in a storage device. For instance, a storage device may include multiple devices (e.g., a RAM card and a solid-state drive (SSD)). In some examples, the memory 112 may be separate from (e.g., separate circuitry from) the machine learning circuit memory 106. The memory 112 may include video replacement instructions 113.

In some examples, the machine learning circuit memory 106 may be included in the memory 112. For instance, a separate memory map in the memory 112 may be utilized for the machine learning circuit memory 106. A separate memory map may maintain a separation between an operating system of the electronic device 102 and the instructions and/or data for the machine learning circuit memory 106. In some examples, the operations of the machine learning circuit 104 described herein may be performed on a processor 110 separate from the operating system and/or an application (e.g., online meeting application) of the electronic device 102. For instance, the operations may be performed in a virtual machine executed by the processor 110.

In some examples, the processor 110 may execute an online meeting application. An online meeting application is an application or program for running and/or participating in an online meeting. An online meeting may be a communication in which video and/or audio are shared between devices over a network (e.g., Internet, cellular phone network, and/or Local Area Network (LAN), etc.) link. For instance, the electronic device 102 may send and/or receive video (e.g., user web cam video) and/or audio (e.g., microphone audio) in an online meeting. In some examples, video depicting a user may be sent from the electronic device 102 to another device (via a communication interface and/or network, for instance). In some examples, an online meeting application may be instructions (e.g., instructions not shown in FIG. 1, an agent application, etc.) installed on the electronic device 102 (e.g., in storage and/or memory 112 of the electronic device 102). An online meeting application may provide a user interface (UI) for an online meeting. For instance, the online meeting application may provide a UI depicting video from the electronic device 102 and/or video received from another device (via a communication interface and/or network, for example). In some examples, the UI may be displayed on a display panel (e.g., integrated display panel, touchscreen, etc.) and/or display device (e.g., linked monitor). In some examples, the online meeting application may manage an audio stream or streams (e.g., audio accompanying a video or videos and/or independent audio stream(s)). For instance, the online meeting application may enable outputting (e.g., outputting via speakers, linked headphones, etc.) and/or muting an audio stream or audio streams (e.g., muting a received audio stream and/or blocking local audio from transmission).

The machine learning circuit memory 106 may be an electronic, magnetic, optical, and/or other physical storage device that contains or stores electronic information (e.g., instructions and/or data). The machine learning circuit memory 106 may be, for example, Random Access Memory (RAM), Electrically Erasable Programmable Read-Only Memory (EEPROM), a storage device, an optical disc, and/or the like. In some examples, the machine learning circuit memory 106 may be volatile and/or non-volatile memory, such as Dynamic Random Access Memory (DRAM), EEPROM, magnetoresistive random-access memory (MRAM), phase change RAM (PCRAM), memristor, flash memory, and/or the like. In some examples, the machine learning circuit memory 106 may be a non-transitory tangible machine-readable or computer-readable storage medium, where the term "non-transitory" does not encompass transitory propagating signals. In some examples, the machine learning circuit memory 106 may include multiple devices (e.g., a RAM card and a solid-state drive (SSD)). In some examples, the machine learning circuit memory 106 may be integrated into the machine learning circuit 104. In some examples, the machine learning circuit memory 106 may include user break detection neural network(s) 108.

The machine learning circuit 104 may be electronic circuitry to process (e.g., perform an operation(s) on) a video stream. For example, the machine learning circuit 104 may be logic circuitry to perform object detection, object tracking, feature point detection, and/or motion estimation, etc. The machine learning circuit 104 may execute a machine learning model or models (e.g., neural network(s)) to perform inferencing (e.g., to infer user presence, user standing up, user leaving, user departure, and/or user attention, etc.) based on a video stream. The machine learning circuit 104 may be a semiconductor-based microprocessor, field-programmable gate array (FPGA), an application-specific integrated circuit (ASIC), and/or other hardware device suitable for retrieval and execution of instructions stored in the machine learning circuit memory 106. The machine learning circuit 104 may fetch, decode, and/or execute instructions stored in the machine learning circuit memory 106. In some examples, the machine learning circuit 104 may include electronic circuitry that includes electronic components for performing an operation or operations described herein without the machine learning circuit memory 106 and/or instructions. In some examples, the machine learning circuit 104 may perform one, some, or all of the aspects, operations, elements, etc., described in one, some, or all of FIG. 1-7. In some examples, the machine learning circuit 104 may be artificial intelligence circuitry. Artificial intelligence circuitry may be circuitry that includes and/or performs machine learning technique(s), learning technique(s), and/or neural network technique(s).

In some examples, the machine learning circuit 104 may receive a video stream. For instance, the machine learning circuit 104 may receive a video stream from an integrated image capturing device. In some examples, the machine learning circuit 104 may receive a video stream from a separate image capturing device. For instance, the machine learning circuit 104 may receive the video stream via a wired or wireless communication interface (e.g., MIPI, USB port, Ethernet port, Bluetooth receiver, etc.). In some examples, the machine learning circuit 104 may receive the video stream independently from (e.g., on a different path from, in parallel to, etc.) the processor 110. For instance, the video stream may be carried on different links, connections, wires, and/or interfaces to the machine learning circuit 104 and the processor 110. In some examples, the machine learning circuit 104 may receive the video stream on a first path and the processor 110 may receive the video stream on a second path, whether the first path is shorter than the second path from an image capturing device. For instance, the machine learning circuit 104 may be disposed physically closer to the image capturing device (and/or to an interface, MIPI, USB, etc.) than the processor 110. For example, the electronic device 102 may be a laptop computer, where the machine learning circuit 104 is disposed in a display panel housing of the laptop computer and the processor 110 is disposed in a body of the laptop computer. The display panel housing may also house an image capturing device (e.g., camera), resulting in the machine learning circuit 104 being disposed more closely to the image capturing device than the processor 110. For instance, the first path between the image capturing device and the machine learning circuit 104 may be disposed in the display panel housing, and the second path may cross a hinge of the laptop computer to the body of the computer to reach the processor 110. In some examples, the machine learning circuit 104 may experience less delay to receive the video stream after capture than the processor 110.

In some examples, the machine learning circuit 104 may detect a user break from an online meeting based on a video stream. A user break may be a period (e.g., beginning of a period) in which a user is disengaged (e.g., not paying attention), outside of a camera field of view, and/or out of a meeting posture (e.g., not seated, not facing a camera, etc.). For example, the machine learning circuit 104 may execute the user break detection neural network(s) 108 to detect a user break from an online meeting based on a video stream. In some examples, the user break detection neural network(s) 108 may include a machine learning model or models (e.g., neural network(s)). In some examples, the machine learning circuit 104 may execute a machine learning model (e.g., neural network) that is trained to detect a user break. For instance, the machine learning circuit 104 may execute a convolutional neural network to detect the user break. The machine learning model may determine a probability that a user break (e.g., break event) has occurred and/or is occurring based on the video stream.

In some examples, the machine learning circuit 104 may detect and/or track a feature point or points of the user. For instance, the machine learning circuit 104 may detect a feature point or points (e.g., corner(s), edge(s), keypoint(s), etc.) associated with the user in video frames. For instance, the machine learning circuit 104 may track the location of the feature point(s) in the video frames. In some examples, tracking the location of the feature point(s) may include matching a feature point (and/or patch including a feature point) in a first video frame to a feature point in a second video frame (e.g., subsequent video frame). For instance, the machine learning circuit 104 may extract pixel information of a feature point and/or patch including the feature point in a first video frame and correlate the patch with windows in the second video frame, where a greatest correlation may indicate the location of the corresponding feature point in the second video frame. A distance (e.g., pixel distance) and/or vector between the feature point in the first video frame and the corresponding feature point in the second video frame may indicate the motion of the user (e.g., user face, user hand, etc.) in the video stream. In some examples, multiple feature points may be tracked and corresponding distances and/or vectors may be combined (e.g., averaged) to detect user motion.

In some examples, the machine learning circuit 104 may perform optical flow to detect user motion. For instance, the optical flow between two successive frames may be computed. Optical flow may be the motion of objects between frames (e.g., consecutive frames, successive frames, etc.) caused by the movement of the objects. In some examples, computing the optical flow may include tracking a set of feature points between two frames, where the tracked set of feature points may enable estimating the motion between the frames.

In some examples, the machine learning model may be trained with training images that depict a gesture or gestures indicating user breaks (e.g., users standing up, users leaving a field of view, users turning around, users making a break gesture, users walking away, users not paying attention, and/or users looking away from the field of view, etc.). For instance, the machine learning circuit 104 (e.g., machine learning model) may perform gesture detection based on the video stream. In some examples, the machine learning circuit 104 (e.g., machine learning model) detects and tracks the hands of a user depicted in the video stream. When the user moves one or both hands in a certain gesture (e.g., palm facing the camera), the machine learning circuit 104 (e.g., machine learning model) may detect the motion and trigger a break event. After an amount of time (e.g., 10 seconds), if the machine learning circuit 104 (e.g., machine learning model) detects another gesture (e.g., the user's hand making a circle motion), an end of the user break may be detected and/or a break end event may be triggered. In some examples, the machine learning circuit 104 may detect the user break by detecting a stand-up motion. The machine learning circuit 104 may detect an end of the user break by detecting a sit-down motion.

In some examples, the machine learning circuit 104 (e.g., machine learning model) detects and tracks the face of a user. For instance, the machine learning model may be trained to detect and/or track a user's face. When a motion is detected (e.g., a motion that is greater than a threshold, when a motion exceeds a threshold speed, etc.) or when the face of the user moves beyond a designated region of the video stream, the machine learning circuit 104 may detect a user break and/or trigger a break event. If the machine learning circuit 104 detects the user's face (e.g., with less motion and/or within the designated region, etc.), the machine learning circuit 104 (e.g., machine learning model) may detect an end of the user break and/or trigger a break end event.

In some examples, the machine learning circuit 104 may detect a user break in response to determining that a tracked user satisfies a motion threshold. For instance, the machine learning circuit 104 may determine whether tracked motion satisfies a motion threshold. In some examples, the motion threshold may be expressed in terms of pixel distance (e.g., 3 pixels, 5 pixels, 10 pixels, 50 pixels, 100 pixels, 213 pixels, etc.). For instance, if the length of a motion vector that expresses the user motion is greater than or equal to the motion threshold, the motion threshold may be satisfied. In some examples, the motion threshold may be expressed in terms of a rate (e.g., speed, velocity, pixels/second, pixels/frame, etc.). For instance, if the motion (e.g., motion vector) in a period of time (e.g., a quantity of time, between frames, and/or a quantity of frames) is greater than or equal to the motion threshold (e.g., 3 pixels/second, 5 pixels/second, 10 pixels/frame, 50 pixels/frame, 100 pixels/second, 213 pixels/second, etc.), the motion threshold may be satisfied. In some examples, a measurement (between two frames, for instance) and/or a combination measurement (e.g., average over multiple frames) may be utilized as the user motion. In some examples, the motion threshold may be utilized to distinguish between a user break and other motion. For instance, user motion above the motion threshold may indicate that a user break is beginning. User motion less than or equal to the motion threshold may indicate that a user break is not occurring and/or that a user break has ended. In some examples, the motion threshold may allow for some motion (e.g., online meeting behavior) without indicating a user break.

In some examples, the machine learning circuit 104 may send an indicator in response to detecting the user break. For instance, the machine learning circuit 104 may execute the user break detection neural network(s) 108 (e.g., presence detection neural network(s)) with a video stream to determine that the user is taking a break and may send an indicator in response to detecting the user break. The indicator may be a signal, value, code, pattern, voltage, and/or current, etc. In some examples, the machine learning circuit 104 may send the indicator to the processor 110. For instance, the machine learning circuit 104 may send the indicator to the processor 110 via a wire, bus, and/or interface (e.g., inter-integrated circuit (I²C) interface). In some examples, the machine learning circuit 104 may send a first indicator indicating a start of a user break and/or a second indicator indicating an end of the user break. In some examples, the machine learning circuit 104 may execute instructions (e.g., other instructions in the machine learning circuit memory 106) to send the indicator.

The processor 110 may replace a portion of the video stream with substitute video in response to the indicator. For instance, the processor 110 may execute the video replacement instructions 113 to replace a portion of the video stream with substitute video in response to the indicator. In some examples, the video replacement instructions 113 may be included in an application and/or driver (e.g., image capturing device driver, camera driver, etc.). For example, the driver may replace a portion of the video stream with the substitute video. Substitute video may be an image or images (e.g., video frames) to replace the video stream or a portion of the video stream (e.g., a portion in time (some video frames) and/or a spatial portion (a region of the video stream)). The substitute video may replace a portion of the video stream during the user break. For example, the processor 110 may execute an application and/or driver to receive inferencing results from the machine learning circuit 104. When the application and/or driver receives the results (e.g., indicator(s)) from the machine learning circuit 104 (e.g., detection of a user walking away) and the application and/or driver has an indication that an online meeting is occurring, the application and/or driver may inject the substitute video (e.g., prerecorded image(s) and/or video) into the video stream. The substitute video and/or injected video may be provided to the online meeting application. Examples of online meeting applications may include Zoom, Microsoft Teams, Google Hangouts, etc.

In some examples, the machine learning circuit 104 and/or processor 110 may create and/or store the substitute video (in the machine learning circuit memory 106 and/or memory 112, for example). For instance, the substitute video may be video captured during an initial portion of an online meeting or may be video captured during a preceding portion of the online meeting before the user break (e.g., prerecorded video). For example, the machine learning circuit 104 and/or processor 110 may detect when an online meeting begins. In some examples, the machine learning circuit 104 and/or processor 110 may detect the beginning of an online meeting by monitoring online meeting application activity. Examples of the online meeting application activity may include the opening of the online meeting application, instantiation of an online meeting object, occurrence of an event corresponding to the online meeting application (e.g., a function call, start of a video stream to the online meeting application, and/or an operating system (OS) task corresponding to the online meeting application, etc.), and/or an indicator provided by the online meeting application. An initial portion of an online meeting may be a portion (e.g., a time range, 30 seconds, 1 minute, 2 minutes, 5 minutes, etc.) of the online meeting from the beginning of the online meeting. For instance, the machine learning circuit 104 and/or processor 110 may detect the beginning of an online meeting and store substitute video in the machine learning circuit memory 106 and/or memory 112 during the initial portion of the online meeting. For example, the substitute video may be video of the user captured by a camera from the first 5 minutes of the online meeting. A preceding portion of an online meeting may be a portion (e.g., a time range, 30 seconds, 1 minute, 2 minutes, 5 minutes, etc.) of the online meeting from before the user break (e.g., in a period before the user break and/or immediately preceding the user break). For example, the electronic device 102 (e.g., machine learning circuit 104, machine learning circuit memory 106, processor 110, and/or memory 112) may buffer video frames (e.g., recent video frames). When the user break occurs, the buffered preceding video may be utilized.

In some examples, the machine learning circuit 104 and/or processor 110 may detect a non-interactive part or parts of the online meeting. A non-interactive part or parts may be a period or periods in which the user is not speaking (e.g., no audio is detected) and/or is not gesturing (e.g., fewer than a threshold number of pixels are changing between frames and/or when no particular gesture is indicating by the machine learning circuit 104). The machine learning circuit 104 and/or processor 110 may store the non-interactive part(s) of the video stream (e.g., from the initial portion of the online meeting or another portion) as the substitute video.

In some examples, the substitute video may include an avatar. For example, the processor 110 may create and/or animate an avatar of the user for the substitute video. For instance, the processor 110 may create video frames including an avatar as the substitute video. An avatar may be a model (e.g., a two-dimensional (2D) or three-dimensional (3D) model) that may represent a user. For example, an avatar may be a cartoon model (e.g., 2D or 3D human model, animal model, etc.), a realistic model (e.g., 2D or 3D realistic model that depicts the user), or a combination thereof (e.g., augmented caricatures).

In some examples, the processor 110 may animate an avatar. For instance, the processor 110 may move the avatar over a set of video frames in accordance with a movement pattern. In some examples, the processor 110 may animate the avatar based on an audio signal from a user during the user break. For instance, the processor 110 may animate an avatar in accordance with an audio signal from a microphone and/or remote device (e.g., phone, wireless microphone, etc.). In some examples, the processor 110 may animate a mouth of an avatar in accordance with audio signal amplitude, frequency, and/or speech structure (e.g., phonemes, words, etc.). For instance, the processor 110 may execute the video replacement instructions 113 to look up and/or apply animations corresponding to words and/or phonemes of the audio signal. In some examples, the machine learning circuit 104 may provide recognized words and/or phonemes to the processor 110 for animation. In some examples, the processor 110 may utilize an animation function that translates audio signal amplitude with avatar mouth size. In some examples, other approaches may be used.

In some examples, the processor 110 may animate the avatar without video from a user during the user break. For instance, the processor 110 may utilize audio received from the user during a user break to animate without using video received from the user during the user break.

In some examples, the processor 110 may create the substitute video independently from an online meeting application. For instance, the processor 110 may execute instructions that are not included in the online meeting application to create the substitute video. In some examples, the online meeting application may be an upper-layer application and the video replacement instructions 113 may be lower-layer instructions. For instance, the video stream substitution may be performed at a lower layer that is outside of the scope of the online meeting application (e.g., without indication to the online meeting application of video stream substitution and/or without online meeting application control over video stream substitution). The substitute video may be provided to the online meeting application as part of the original video stream (e.g., as if the substitute video stream were the original video stream).

Figure 2:
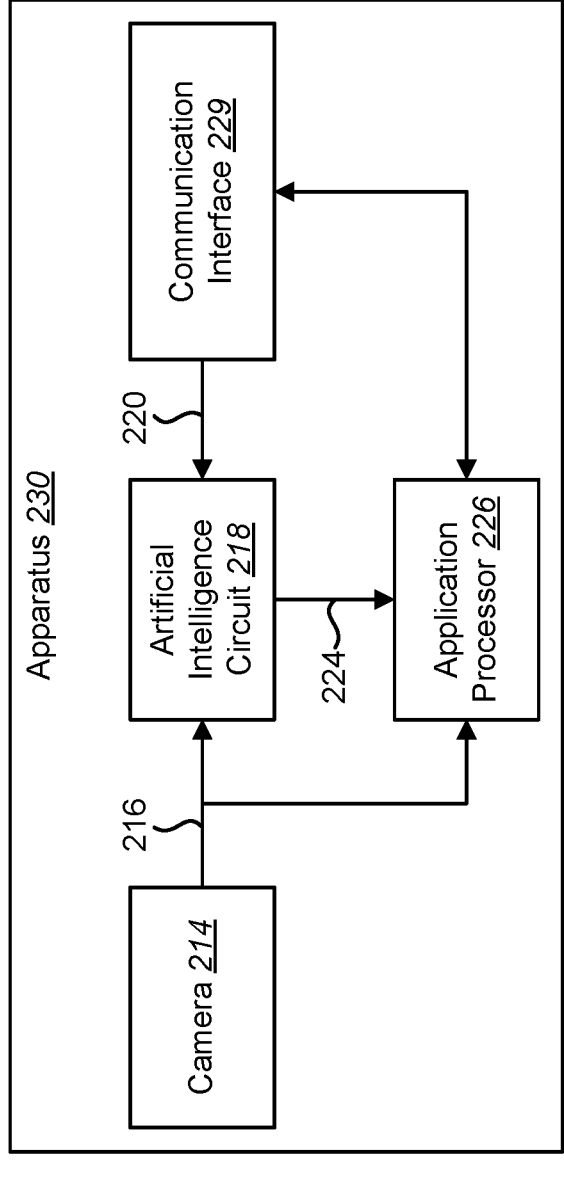
FIG. 2 is a block diagram illustrating an example of an apparatus for substituting meeting video.

FIG. 2 is a block diagram illustrating an example of an apparatus 230 for substituting meeting video. In some examples, the apparatus 230 may perform an aspect or aspects of the operations described in FIG. 1. The apparatus 230 may be an example of the electronic device 102 described in FIG. 1. In some examples, the apparatus 230 may include a camera 214, artificial intelligence circuit 218, a communication interface 229, and/or an application processor 226. Examples of the apparatus 230 may include a computing device, smartphone, laptop computer, tablet device, mobile device, etc.). In some examples, one, some, or all of the components and/or elements of the apparatus 230 may be structured in hardware and/or circuitry. In some examples, the apparatus 230 may perform one, some, or all of the operations described in FIG. 1-7.

A camera 214 may capture a video stream 216. For instance, the video stream 216 may be captured at a frame rate and a resolution. The video may depict an environment and/or user(s). For instance, the video stream 216 may depict an environment and a person. In some examples, the camera 214 may be an example of the image capturing device described in FIG. 1. The video stream 216 may be provided to artificial intelligence circuit 218 and/or to the application processor 226. The artificial intelligence circuit 218 may be an example of the machine learning circuit 104 described in FIG. 1 and/or the machine learning circuit 104 described in FIG. 1 may be an example of the artificial intelligence circuit 218.

The artificial intelligence circuit 218 may infer whether a user is leaving a field of view of a camera (e.g., camera 214) based on an input stream to produce inference data 224. An input stream may be a stream of input information (e.g., video, audio, and/or other input). For instance, an input stream may include the video stream 216, an audio stream, and/or other information (e.g., input device information). In some examples, an audio stream may be captured and/or received from an integrated microphone or from a remote device (e.g., wireless microphone, smartphone, tablet, mobile device, etc.). For instance, an audio stream and/or other information 220 may be received from the communication interface 229 and/or from an integrated microphone (not shown in FIG. 2). The input stream may be provided to the artificial intelligence circuit 218 and/or the application processor 226. In some examples, the input stream includes an audio stream, and the artificial intelligence circuit 218 may infer that a user is leaving the field of view in response to a voice command. For instance, the artificial intelligence circuit 218 may execute a machine learning model or models (e.g., neural network(s), CNN(s), RNN(s), etc.) to recognize a voice command (e.g., "laptop, I'm taking a break") uttered by a user.

In some examples, the artificial intelligence circuit 218 may infer whether a user is leaving a field of view as described in FIG. 1. For instance, the artificial intelligence circuit 218 may determine that a user is leaving the field of view by detecting that the user is standing up, walking, and/or is no longer detected in the field of view of the camera 214.

The inference data 224 may be data that indicates inferencing results from the artificial intelligence circuit 218. For instance, the inference data 224 may indicate a most likely classification (e.g., user break starting, user break end, user standing up, user disengaged, user leaving, etc.) and/or may indicate probabilities corresponding to a classification or classifications (e.g., user break=70%, user break end=10%, user standing=15%, user seated=80%, etc.). The artificial intelligence circuit 218 may send the inference data 224. For instance, the artificial intelligence circuit 218 may send the inference data 224 to the application processor 226.

In some examples, the application processor 226 may be an example of the processor 110 described in FIG. 1. the application processor 226 may receive the inference data 224 from the artificial intelligence circuit 218. For instance, the application processor 226 may receive the inference data 224 via a bus, wire, internal interface (e.g., I²C interface), etc.

In some examples, the application processor 226 may modify video in response to the inference data 224 indicating that the user is leaving the field of view to produce modified video. For instance, if the inference data 224 indicates that the user is leaving the field of view (e.g., if the inference data indicates that a user break is starting and/or that a gesture associated with a user break is detected with greater than threshold probability, etc.), the application processor 226 may replace a portion of the video stream 216 with substitute video. In some examples, the application processor 226 may modify video as described in FIG. 1. For instance, the application processor 226 may replace a portion of the video stream 216 with prerecorded video (from an initial portion of the online meeting, for instance) and/or with an animated avatar. In some examples, the apparatus 230 (e.g., communication interface 229) may include a receiver to receive an audio signal from a remote device (e.g., wireless microphone, smartphone, etc.) when the user is outside of the field of view. The application processor 226 may animate an avatar based on the audio signal to produce the modified video.

In some examples, the application processor 226 may provide the modified video to an online meeting application. For instance, the application processor 226 may execute a camera driver that produces the modified video. The camera driver may supply the modified video to the online meeting application that is being executed by the application processor 226. In some examples, the modified video may be provided to the communication interface 229 (by the online meeting application, for instance) to be transmitted to and/or shared with another device or devices.

Figure 3:
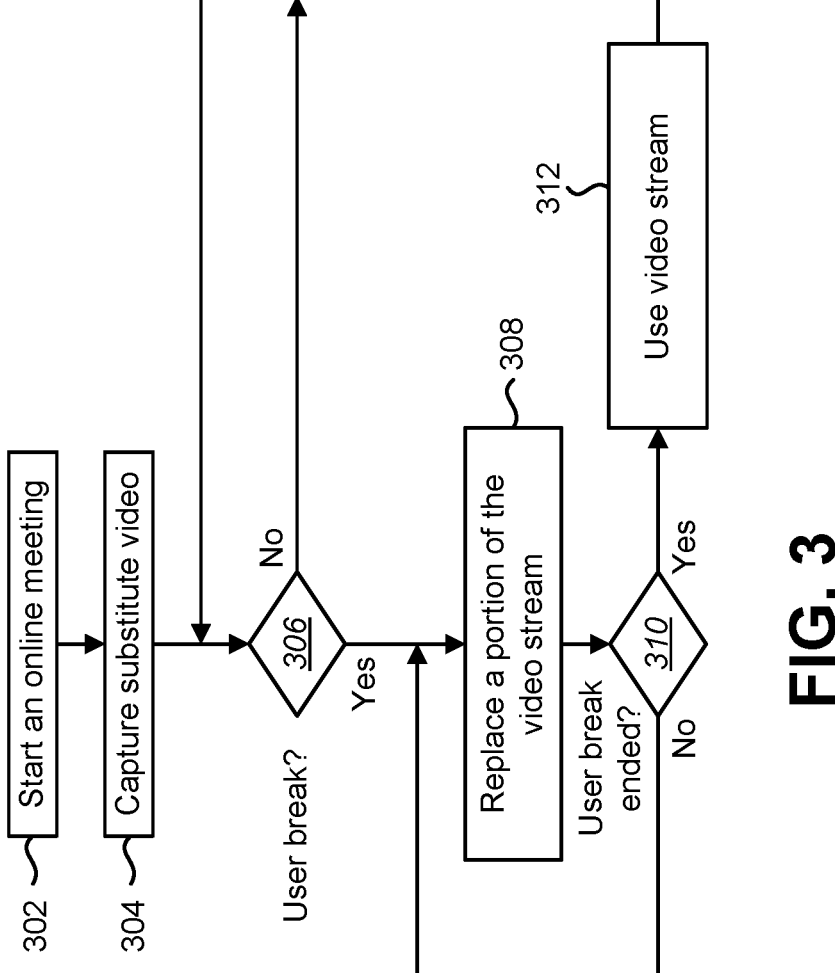
FIG. 3 is a flow diagram illustrating an example of a method for substituting meeting video.
Figure 3:
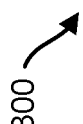

FIG. 3 is a flow diagram illustrating an example of a method 300 for substituting meeting video. The method 300 and/or a method 300 element or elements may be performed by an electronic device and/or apparatus (e.g., electronic device 102, apparatus 230, laptop computer, smartphone, tablet device, etc.). For example, the method 300 may be performed by the electronic device 102 described in FIG. 1 and/or the apparatus 230 described in FIG. 2.

At 302, an apparatus may start an online meeting. For instance, an online meeting application may be executed to create, host, and/or join an online meeting.

At 304, the apparatus captures substitute video. For example, at the start of the online meeting, the apparatus (e.g., camera) may capture a video stream. The apparatus (e.g., artificial intelligence circuit and/or application processor) may record video (e.g., a clip of the user) from an initial portion of the meeting. In some examples, capturing substitute video may be performed as described in FIG. 1 and/or FIG. 2.

At 306, the apparatus may determine whether a user break is detected. In some examples, determining whether a user break is detected may be performed as described in FIG. 1 and/or FIG. 2. For instance, a user break event may be triggered when an artificial intelligence circuit detects a user break. In some examples, a user break event may be triggered manually. For instance, the apparatus may detect an input indicating a user break. For example, an input device (e.g., keyboard, touchscreen, etc.) may detect a certain input (e.g., depression of the "b" on the keyboard, etc.) that indicates that a user break will occur.

In a case that the apparatus determines that a user break is not occurring, operation may return to determining whether a user break is detected at 306 (for a later time, for instance).

In a case that the apparatus determines that a user break is detected, the apparatus may replace a portion of the video stream at 308. In some examples, replacing a portion of the video stream may be performed as described in FIG. 1 and/or FIG. 2. For instance, the apparatus may provide prerecorded substitute video and/or video of an avatar. In some examples, the apparatus may animate a still image acquired at the beginning of the online meeting. The animation may be synched with a user voice to produce a realistic appearance if the user speaks when outside of camera view.

At 310, the apparatus may determine whether a user break has ended. In some examples, determining whether a user break has ended may be performed as described in FIG. 1 and/or FIG. 2. For example, the apparatus (e.g., artificial intelligence circuit) may detect a gesture and/or return of a user indicating that the user break has ended. In some examples, at the end of a user break, a manual input (e.g., the same or a different input to start a user break) may be received to indicate that the break has ended.

In a case that the apparatus determines that the user break has not ended, operation may return to replacing a portion of the video stream at 308. For instance, the apparatus may continue to replace a portion of the video stream with substitute video. In some examples, if the length of the user break exceeds a length of the substitute video, the apparatus may loop (e.g., restart) the substitute video to continue replacing a portion of the video stream. In some examples, the apparatus may continue to generate and/or animate an avatar as the user break continues.

In a case that the apparatus determines that the user break has ended, the apparatus may use the video stream at 312. For example, the apparatus may use the video stream (without modification, for instance) and/or may discontinue replacing the video stream with substitute video. Operation may return to determining whether a user break is detected at 306 (for a later time, for instance).

FIG. 4 is a block diagram illustrating an example of a computer-readable medium 450 for substituting meeting video. The computer-readable medium 450 is a non-transitory, tangible computer-readable medium. The computer-readable medium 450 may be, for example, RAM, EEPROM, a storage device, an optical disc, and/or the like. In some examples, the computer-readable medium 450 may be volatile and/or non-volatile memory, such as DRAM, EEPROM, MRAM, PCRAM, memristor, flash memory, and/or the like. In some examples, the computer-readable medium 450 described in FIG. 4 may be an example of the machine learning circuit memory 106 and/or the memory 112 described in FIG. 1.

The computer-readable medium 450 may include code (e.g., data and/or instructions). For example, the computer-readable medium 450 may include reception instructions 452, online meeting instructions 454, user presence determination instructions 456, and/or video stream modification instructions 458.

The reception instructions 452 may include instructions when executed cause a processor of an electronic device to receive a video stream. In some examples, receiving a video stream may be performed as described in FIG. 1, FIG. 2, and/or FIG. 3.

The online meeting instructions 454 may include instructions when executed cause the processor to send the video stream through an online meeting application. In some examples, sending the video stream through an online meeting application may be performed as described in FIG. 1, FIG. 2, and/or FIG. 3. For instance, the processor (e.g., camera driver) may provide the video stream to a higher-layer online meeting application, which may send the video stream (e.g., provide the video stream to a communication interface for transmission and/or sharing).

The user presence determination instructions 456 may include instructions when executed cause the processor to determine that a user is leaving the electronic device. In some examples, determining whether the user is leaving the electronic device may be performed as described in FIG. 1, FIG. 2, and/or FIG. 3.

The video stream modification instructions 458 may include instructions when executed cause the processor to modify the video stream to produce a modified video stream separately from the online meeting application. In some examples, modifying the video stream to produce a modified video stream separately from the online meeting application may be performed as described in FIG. 1, FIG. 2, and/or FIG. 3.

The online meeting instructions 454 may include instructions when executed cause the processor to send the modified video stream through the online meeting application. In some examples, sending the modified video stream through an online meeting application may be performed as described in FIG. 1, FIG. 2, and/or FIG. 3. For instance, the processor (e.g., camera driver) may provide the modified video stream to a higher-layer online meeting application, which may send the modified video stream (e.g., provide the modified video stream to a communication interface for transmission and/or sharing).

In some examples, the user presence determination instructions 456 may include instructions when executed cause the processor to determine that the user has returned to the electronic device. In some examples, determining whether the user has returned to the electronic device may be performed as described in FIG. 1, FIG. 2, and/or FIG. 3.

In some examples, the video stream modification instructions 458 may include instructions when executed cause the processor to discontinue modifying the video stream in response to determining that the user has returned to the electronic device. In some examples, discontinuing modifying the video stream may be performed as described in FIG. 1, FIG. 2, and/or FIG. 3. In some examples, the online meeting instructions 454 may include instructions when executed cause the processor to send the video stream through the online meeting application in response to determining that the user has returned to the electronic device.

Figures 5, 6:
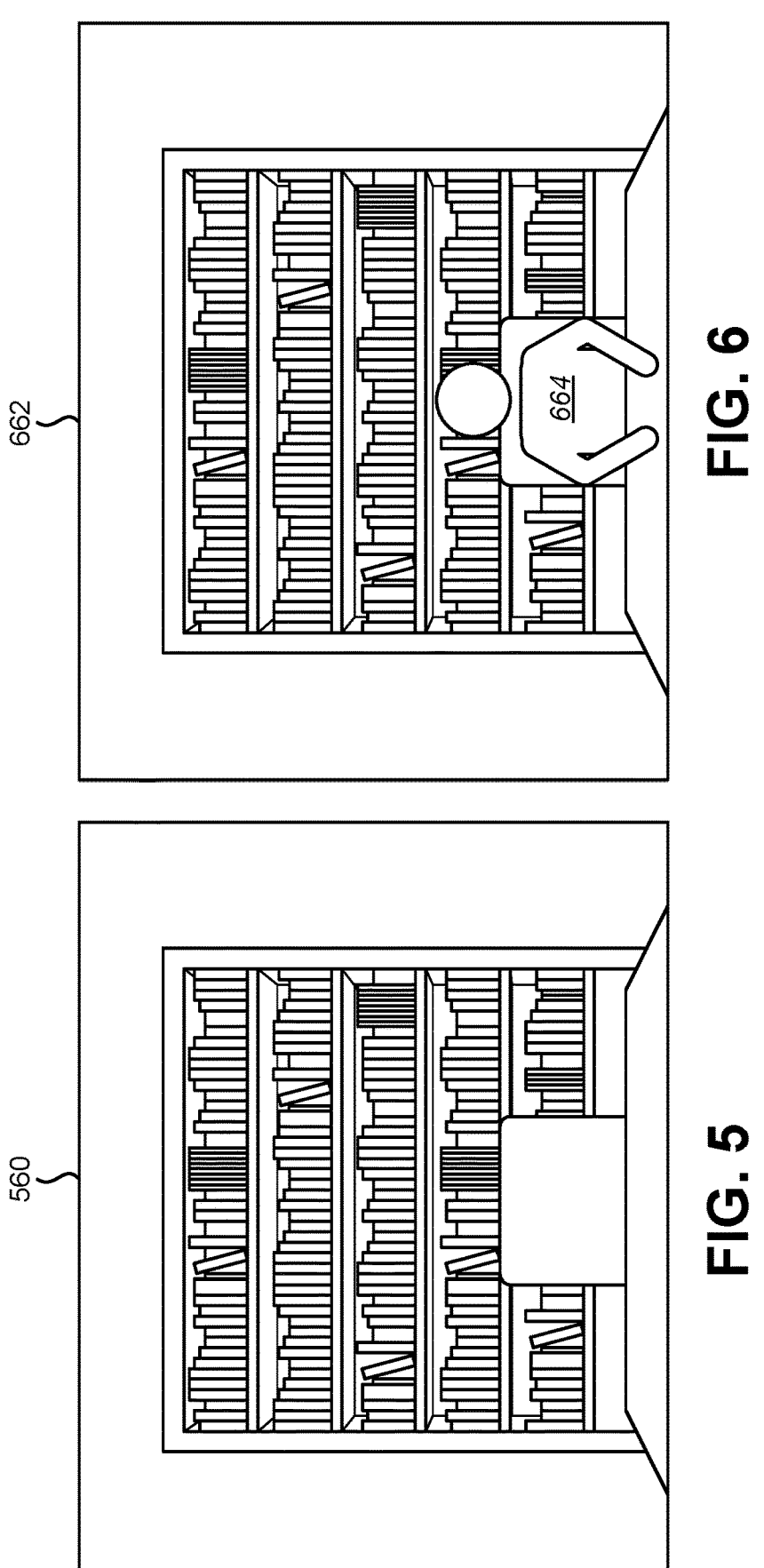
FIG. 5 is a diagram illustrating an example of a video stream during a user break.
FIG. 6 is a diagram illustrating an example of substitute video.

FIG. 5 is a diagram illustrating an example of a video stream 560 during a user break. FIG. 6 is a diagram illustrating an example of substitute video 662. FIG. 5 and FIG. 6 are described together. During an online meeting, for example, a user may decide to take a break (e.g., leave an electronic device and/or apparatus that is capturing the video stream 560, leave a field of view of a camera, etc.). While the user is away from the electronic device and/or apparatus, the video stream 560 may depict an environment without a user. In some examples of the techniques described herein, substitute video 662 may be utilized to replace a portion of the video stream 560. For example, when an electronic device (e.g., electronic device 102) and/or apparatus (e.g., apparatus 230) detects a user break, the substitute video 662 may replace a portion of the video stream 560 (e.g., a portion of the video stream 560 when a user is not present). For instance, the substitute video 662 may depict the user 664. In some examples, the substitute video 662 may be prerecorded video when the user 664 was present and/or may include an avatar of the user 664. In this way, online meeting disruption may be reduced in cases when a user break occurs.

In some examples, a portion of a video stream for replacement may be video frames beginning at the detected user break (or within a quantity of frames after the detected user break, such as 10, 20, 30, or 60 frames, etc., for example) until a detected user return. For instance, when a user break is detected, the electronic device (e.g., electronic device 102, processor 110, etc.) may replace frames of the video stream with frames of the substitute video (e.g., a frame of substitute video for each frame of the video stream) until a frame of a detected user return (or within a quantity of frames from the detected user return, such as 10, 20, 30, or 60 frames, etc., for example). For instance, a progressive sequence of video frames of the video stream may be replaced with a progressive sequence of substitute video frames. In a case that the quantity of frames of the video stream during the user break exceeds a quantity of frames of the substitute video, the electronic device (e.g., electronic device 102, processor 110, etc.) may loop the substitute video (e.g., continue to replace from the initial frame of the substitute video once the last frame of substitute video is reached). Upon a detected user return (or within a quantity of frames from the detected user return, for instance), the electronic device (e.g., electronic device 102, processor 110, etc.) may resume using the video stream and/or may discontinue video frame replacement. In some examples, other approaches to video stream replacement may be utilized. For instance, video stream replacement may continue for the length of the substitute video and continue with a still image (e.g., a sequence of copies of the last frame of the substitute video) or may discontinue at the end of the substitute video.

Figure 7:
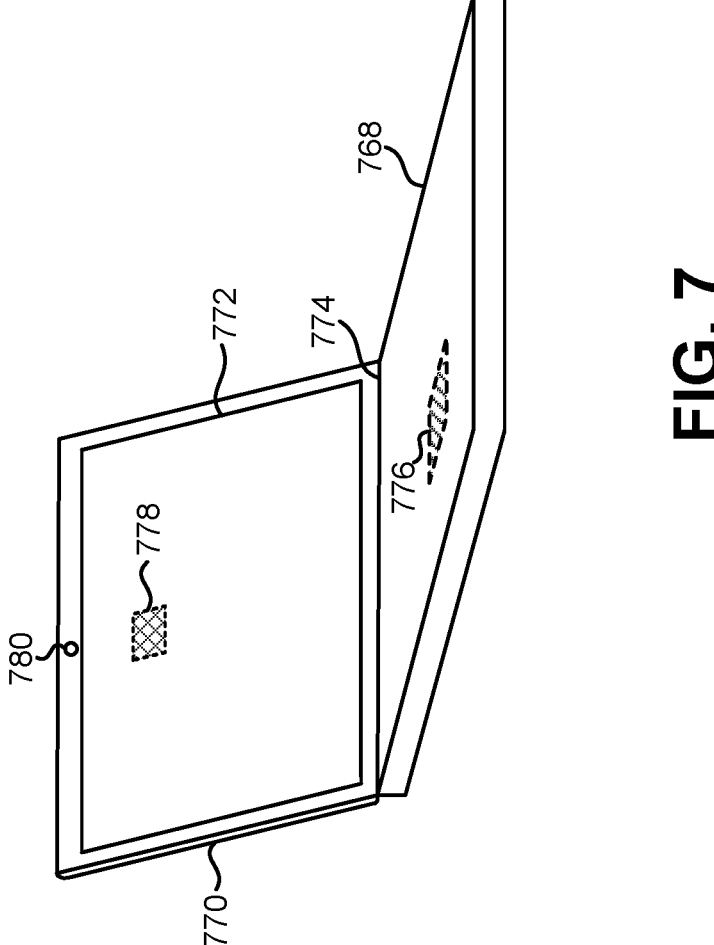
FIG. 7 is a diagram illustrating an example of a laptop computer that includes a machine learning circuit and a processor.

FIG. 7 is a diagram illustrating an example of a laptop computer 766 that includes a machine learning circuit 778 and a processor 776. The laptop computer 766 may be an example of the electronic device 102 described in FIG. 1 and/or of the apparatus 230 described in FIG. 2. In this example, the laptop computer 766 includes a body 768 and a display panel housing 770. In some examples, the display panel housing 770 may be rotatably coupled to the body 768 with a hinge 774, which may allow the display panel housing 770 to rotate into contact with the body 768 when closing the laptop computer 766.

The body 768 may house a component or components. For example, the body 768 may house a processor 776. The processor 776 may be a CPU and/or application processor. Examples of other components that may be housed in the body 768 may include memory and/or storage (e.g., RAM, solid state drive (SSD), etc.), a keyboard, motherboard, port(s), etc.

The display panel housing 770 may house a component or components. For example, the display panel housing 770 may house a display panel 772, a machine learning circuit 778, and a camera 780. The camera 780 may be coupled to the machine learning circuit 778 on a first path (e.g., first electronic link) and may be coupled to the processor 776 on a second path (e.g., second electronic link). In some examples, the first path is shorter than the second path. For example, the machine learning circuit 778 may be disposed more closely to the camera 780 than the processor 776. The machine learning circuit 778 may be able to receive a video stream from the camera 780 with less delay than the processor 776. This arrangement may help the machine learning circuit 778 perform inferencing (e.g., object detection, tracking, classification, etc.) with less delay than if a machine learning circuit were similarly situated with a processor. For instance, the machine learning circuit 778 may receive a video stream before the processor 776, may detect a user break, and notify the processor 776 with reduced delay in some examples of the techniques described herein.

In some examples, the machine learning circuit 778 may receive a video stream from the camera 780. For instance, the camera 780 may send video frames to the machine learning circuit 778. The machine learning circuit 778 may utilize a CNN to perform computer vision operations. When the machine learning circuit 778 detects that a user is standing up and/or walking away, the machine learning circuit 778 may send an indicator (e.g., trigger) to a camera driver executed on the processor 776. When the camera driver receives the trigger and also detects that an online meeting is in progress, the camera driver may manipulate video processing operations in the camera driver stack to output prerecorded video instead of the live video. The prerecorded video may be provided to an online meeting application (e.g., upper-layer application).

As used herein, the term "and/or" may mean an item or items. For example, the phrase "A, B, and/or C" may mean any of: A (without B and C), B (without A and C), C (without A and B), A and B (without C), B and C (without A), A and C (without B), or all of A, B, and C.

While various examples are described herein, the described techniques are not limited to the examples. Variations of the examples are within the scope of the disclosure. For example, operations, aspects, and/or elements of the examples described herein may be omitted or combined.

The invention claimed is:
1. An electronic device, comprising:
a machine learning circuit to:
detect a user break from an online meeting based on a video stream received by the machine learning circuit; and
send an indicator in response to detecting the user break; and
a processor coupled to the machine learning circuit, wherein the processor is to:
replace a portion of the video stream received by the processor with substitute video in response to the indicator;
wherein the machine learning circuit receives the video stream on a first path and the processor receives the video stream on a second path, wherein the first path is shorter than the second path from an image capturing device.

2. The electronic device of claim 1, wherein the machine learning circuit is to execute a convolutional neural network to detect the user break.

3. The electronic device of claim 1, wherein the machine learning circuit is to detect the user break by detecting a stand-up motion.

4. The electronic device of claim 1, wherein the processor is to create the substitute video independently from an online meeting application.

5. The electronic device of claim 1, wherein the substitute video is video captured during an initial portion of the online meeting or is video captured during a preceding portion of the online meeting before the user break.

6. The electronic device of claim 1, wherein the substitute video includes an avatar, and wherein the processor is to animate the avatar based on an audio signal from a user during the user break.

7. The electronic device of claim 1, wherein the machine learning circuit is to receive the video stream independently from the processor.

8. The electronic device of claim 1, wherein the electronic device is a laptop computer, wherein the machine learning circuit is disposed in a display panel housing of the laptop computer and the processor is disposed in a body of the laptop computer.

9. The apparatus of claim 1, wherein the machine learning circuit experiences less delay to receive the video stream after capture than the processor.

10. The electronic device of claim 1, wherein the user break is detected based on one or more of a period in which the user is disengaged, a period in which the user is outside of a camera field of view, or a period in which the user is out of a meeting posture.

11. The electronic device of claim 1, wherein the machine learning circuit is disposed in a display panel housing of the electronic device and the processor is disposed in a body of the electronic device.

12. An apparatus, comprising:
an artificial intelligence circuit to:
infer whether a user is leaving a field of view of a camera based on an input stream to produce inference data, wherein the input stream comprises an audio stream and wherein the artificial intelligence circuit is to infer that the user is leaving the field of view in response to a voice command; and
send the inference data; and
an application processor to:
receive the inference data from the artificial intelligence circuit;
modify video in response to the inference data indicating that the user is leaving the field of view to produce modified video; and
provide the modified video to an online meeting application.

13. The apparatus of claim 12, further comprising a receiver to receive an audio signal from a remote device when the user is outside of the field of view, and wherein the application processor is to animate an avatar based on the audio signal to produce the modified video.

14. The apparatus of claim 12, wherein the inference data comprises one or more of a most likely classification or probabilities corresponding to one or more classifications.

15. The apparatus of claim 12, wherein the input stream comprises an audio stream.

16. A non-transitory tangible computer-readable medium comprising instructions when executed cause a processor of an electronic device to:

receive a video stream;

send the video stream through an online meeting application;

determine that a user is leaving the electronic device;

modify the video stream to produce a modified video stream separately from the online meeting application;

animate an avatar based on an audio signal to produce the modified video, wherein a receiver is to receive the audio signal from a remote device when the user is outside of the field of view; and send the modified video stream through the online meeting application.

17. The non-transitory tangible computer-readable medium of claim 16, further comprising instructions when executed cause the processor to determine that the user has returned to the electronic device.

18. The non-transitory tangible computer-readable medium of claim 17, further comprising instructions when executed cause the processor to discontinue modifying the video stream and send the video stream through the online meeting application in response to determining that the user has returned to the electronic device.

\* \* \* \* \*